United States Patent [19]

Kameyama et al.

[11] 4,132,939
[45] Jan. 2, 1979

[54] DRIVING SIGNAL CONTROL CIRCUIT

[75] Inventors: Masayoshi Kameyama, Sagamihara; Hiroshi Horiguchi, Kawagoe; Kazuo Ichino, Tokyo, all of Japan

[73] Assignee: Hitachi, Ltd., Japan

[21] Appl. No.: 817,746

[22] Filed: Jul. 21, 1977

[30] Foreign Application Priority Data

Jul. 23, 1976 [JP] Japan .................................. 51-87290

[51] Int. Cl.² ............................................. G05G 5/00
[52] U.S. Cl. .................................... 318/627; 318/282; 318/611; 318/467
[58] Field of Search ................... 318/627, 626, 282 R, 318/569, 592, 601, 603, 604, 611, 616, 623, 635, 652, 467

[56] References Cited

U.S. PATENT DOCUMENTS

| | | | |
|---|---|---|---|
| 3,795,853 | 3/1974 | Whitehouse | 318/626 |
| 4,078,198 | 3/1978 | Murakosi et al. | 318/627 |

Primary Examiner—Herman J. Hohauser
Attorney, Agent, or Firm—Craig & Antonelli

[57] ABSTRACT

This invention relates to a driving signal control circuit, in which at least four detecting points (or detectors) are arranged for detecting the position of the working table, which is repeatedly reciprocated between the detecting points. The control circuit includes a clock generator for generating a clock signal in accordance with a start signal, a gate circuit operative in response to detecting signals derived from the detectors when the working table has reached the detecting points, for selectively applying the clock signal as an Up output signal or a Down output signal and for providing a switching signal, a counter circuit for adding the Up output signal or for subtracting the Down output signal, a digital-to-analog converter for converting a digital output signal of the counter circuit into an analog signal, and a switching circuit operative for generating a driving signal with negative polarity or positive polarity in accordance with the switching signal and corresponding to the analog signal in value, whereby the working table can be smoothly moved by the driving signal without generating mechanical vibration in the working table.

11 Claims, 4 Drawing Figures

DRIVING SIGNAL CONTROL CIRCUIT

BACKGROUND OF THE INVENTION

This invention relates to a driving signal control circuit for use in a machine tool in which a workpiece is mounted on a two-dimensional table which can be moved in directions to the right and left or backward and forward by a driving source, such as a DC motor, and is further worked by a rotating tool, such as a grinding wheel.

In a conventional machine tool, in which a workpiece is mounted on a two-dimensional table which can be repeatedly reciprocated by normally or reversely rotating a driving motor so that the workpiece may be worked by an upwardly and downwardly moving rotating wheel, such as a grinding wheel, for instance, two detectors are arranged to be separated from each other by a distance depending upon the length or width of the workpiece to be worked. Thus, the two-dimensional table is moved by the driving motor until it reaches the points at which the detectors have been arranged, and then at these points the driving motor can be reversed in a state of constant velocity, whereby the moving direction of the working table is changed.

But in such means, at the end points of movement of the table the motor is subjected to an inertial force in the moving direction, and also at the same time the motor generates a driving power in the opposite direction so that the table is subjected to mechanical vibration when its direction of movement is reversed. Further, the workpiece mounted on the table is subjected to stress in the upward and downward directions and in the forward and backward directions at this time. Similarly, when starting and stopping the machine tool, the mechanical vibration arise in the table, so that the workpiece is subjected to the same type of stress. Thus, in the conventional machine tool, it has been impossible to uniformly work or grind a surface of a workpiece with high precision.

As stated above, in such a machine tool, the drive of the two-dimensional table can be performed by switching on and off the voltage impressed on the motor as a driving source and by changing the polarity of the impressed voltage. By such means, the impressed voltage is instantaneously varied, so that mechanical vibration arises in the table. Thus, in the conventional machine tool, the disadvantage is that convex and concave portions are produced on the worked surface of the workpiece, and therefore, it has been impossible to produce a workpiece with a high precision having a uniform surface.

SUMMARY OF THE INVENTION

It is an object of the present invention to eliminate the above-mentioned disadvantages of the conventional machine tool; more particularly, it is an object to provide a driving signal control circuit for use in a machine tool, such as a surface grinder, a cylindrical grinder, or the like, by which a workpiece mounted on a working table can be uniformly worked or grinded with high precision and without resulting mechanical vibration due to the instantaneous fluctuations of the driving motor.

To carry out the above-stated object of the present invention, at least four detecting points (or detectors) are arranged for detecting the position of the working table which is repeatedly reciprocated between the detecting points. Further, the present invention is provided with a clock generator for generating a clock signal in accordance with a start signal, a gate circuit operative in response to detecting signals derived from the detectors when the working table passes through the detecting points for passing or stopping the clock signal as an Up output signal or a Down output signal and for providing a switching signal, a counter circuit for adding the Up output signal or for subtracting the Down output signal, a digital-to-analog converter for converting the digital output signal of the counter circuit into an analog signal, and a switching circuit operative in response to the switching signal for generating a driving signal with negative or positive polarity corresponding to the analog signal, to thereby move the working table smoothly without generating a mechanical vibration therein.

DETAILED DESCRIPTION OF THE PREFERRED EMBODIMENTS

The present invention will be hereinafter explained in detail with reference to the drawings.

Figure 1:
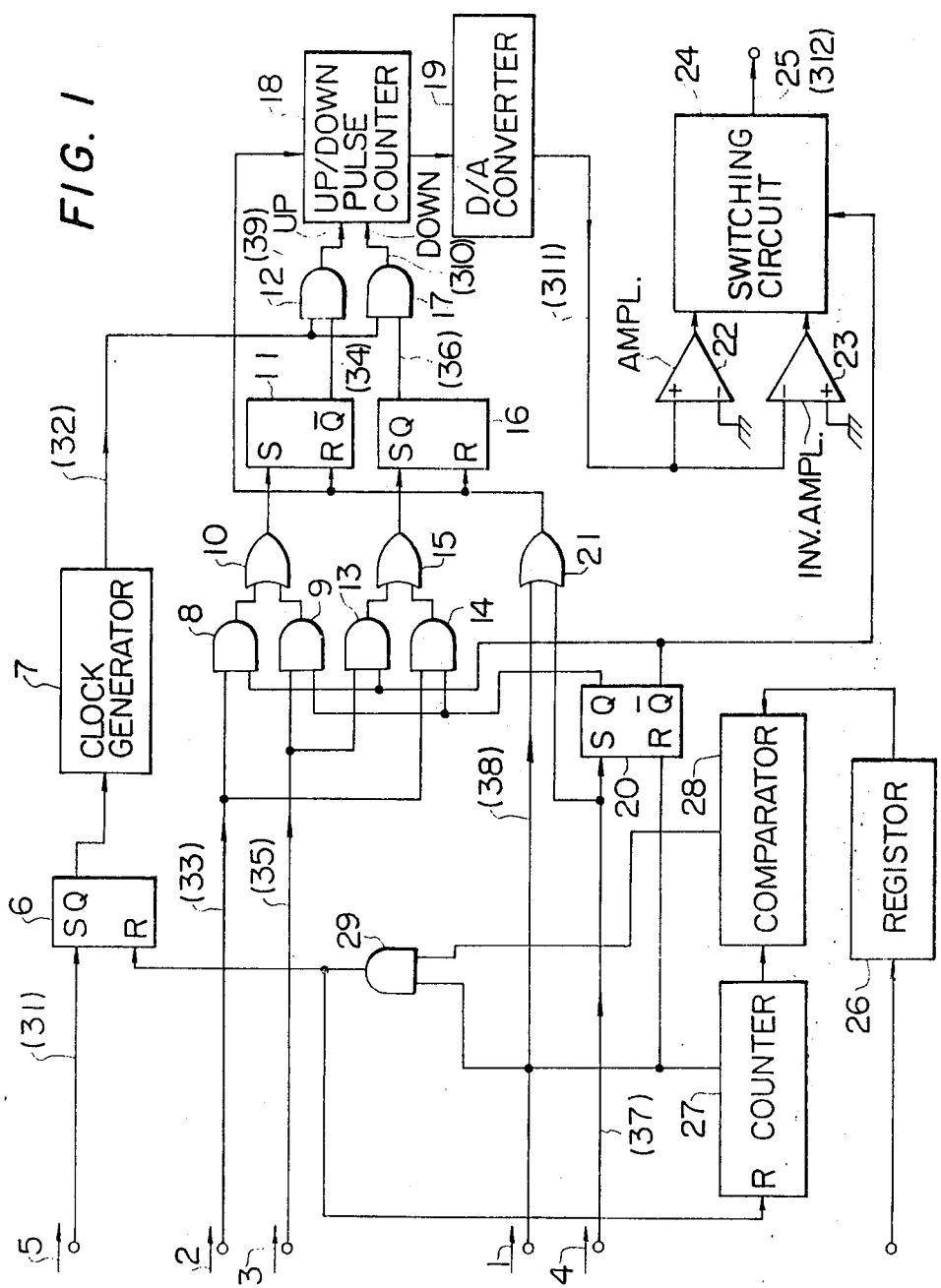
FIG. 1 is a circuit diagram illustrating an embodiment of the present invention.
Figure 2:
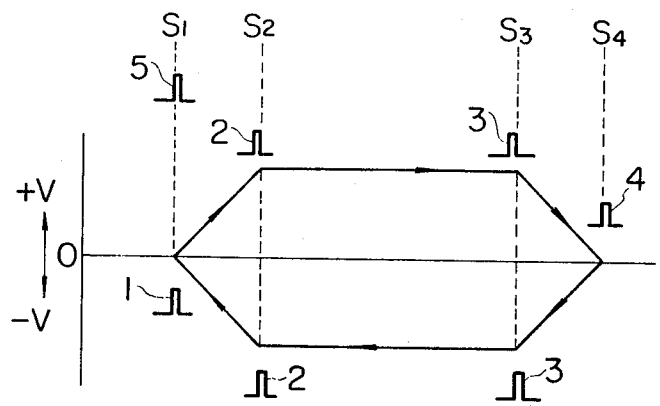
FIG. 2 is a diagram illustrating the relation of the respective detecting points to the driving signals.
Figure 3:
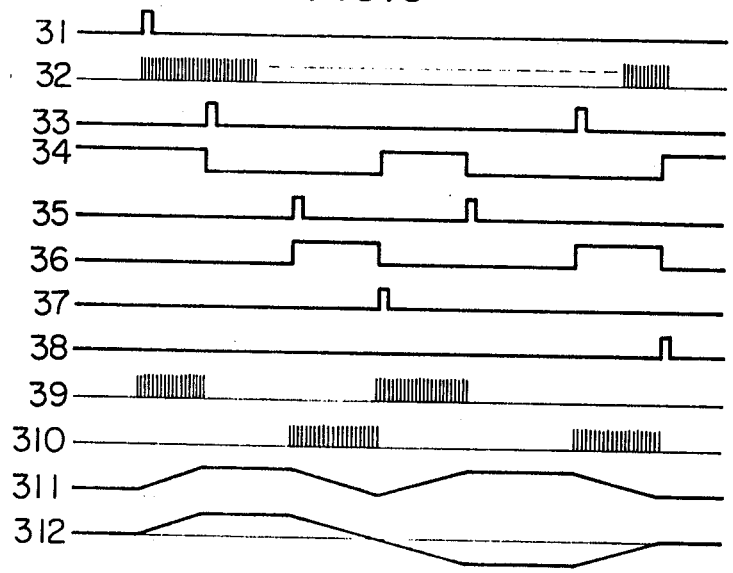
FIG. 3 is a time chart illustrating the respective signals in the circuit of FIG. 1.

FIG. 1 is a circuit diagram illustrating an embodiment of the driving signal control circuit of the present invention, and various signals provided therein are shown in FIG. 3. Then, FIG. 2 is a view illustrating the relation of the respective detecting points to the driving signals.

In the present invention at least four detectors, such as photoelectric elements or the like, are arranged in the moving direction to the right and left or in the forward and backward moving directions of a two-dimensional table on which a workpiece is mounted in a machine tool. The polarity and voltage of a driving signal for driving a DC motor by which the working table can be driven is controlled by a detecting signal derived from the detectors. Thus, in accordance with the detecting signal, the rotating direction and rotating velocity of the DC motor can be controlled. In this way, the above-mentioned disadvantages in the conventional machine tool control can be solved.

Firstly, the state of the driving signal being changed will be explained with reference to FIG. 2. In the drawing the reference characters $S_1$ to $S_4$, respectively, denote the detecting points at which the detecting signals 1 to 4 are derived from the four detectors. The working table can be moved in a direction and at a velocity, respectively, corresponding to the polarity and the magnitude of the driving signal V, and thus can be repeatedly reciprocated from $S_1$ to $S_4$.

When the working table is at the point $S_1$, the driving signal V presents a positive polarity. A start signal 5 is applied, and then the value of the driving signal V is gradually increased. At the same time, the working table starts to move from the point $S_1$ to the right (as seen in the drawing), that is, in the positive direction. Further, the movement of the working table is accelerated until the working table reaches the point $S_2$. Then, the second detecting signal 2 is derived from the second detector, and the value of driving signal V becomes constant. Ultimately, the working table reaches the point $S_3$ at a constant velocity. At that point $S_3$, the third detecting signal 3 is derived from the third detector. At this point, the value of driving signal V is gradually decreased, so that the moving velocity of the working table decreases and the table eventually reaches the point $S_4$ in a state of almost zero velocity.

Then, the fourth detecting signal 4 is derived from the fourth detector, and the driving signal is inverted to a negative polarity. At this time, the working table starts to be moved from the point $S_4$ to the left (in the drawing), that is, in the negative direction. In contrast to the movement of the table in the positive direction, the value of driving signal V is, in the negative direction, increased from the point $S_4$ to the point $S_3$, and at the same time the movement of the working table is accelerated. And then, the working table is constantly moved from the point $S_3$ to the point $S_2$. Further, the moving velocity of the working table is decreased from the point $S_2$ to the point $S_1$, and approaches the point $S_1$ in a state of almost zero velocity. By this time, the reciprocating movement of the working table has finished one cycle. Further, at this point $S_1$, the first detecting signal 1 is derived from the first detector, and at the same time the driving signal is changed to a positive polarity. Then, the working table starts to be moved again in the positive direction.

As mentioned above, the driving signal varies between positive polarity and negative polarity, so that the working table can be started, accelerated, decelerated and reversed, and such movement can be smoothly repeated without generating mechanical vibration in the table.

In FIG. 1 the reference numeral 6 denotes a one sequence flip-flop, 7 a clock generator, 8 an "and" circuit for instructing constant velocity in the positive (moving) direction, 9 and "and" circuit for instructing constant velocity in the negative (moving) direction, 10 an "or" circuit for passing through instruction signal sent from the "and" circuits 8 and 9, 11 a flip-flop for the constant velocity interval in the positive direction and the negative direction, 12 an "and" circuit used in generating signal for acceleration in the positive direction and the negative direction, 13 an "and" circuit for instructing to decelerate velocity in the positive direction, 14 an "and" circuit for instructing to decelerate velocity in the negative direction, 15 an "or" circuit for passing through instruction signal sent from the "and" circuits 13 and 14, 16 a flip-flop for the decleration interval in the positive direction and the negative direction, 17 an "and" circuit used in generating deceleration signal in the positive direction and the negative direction, 18 an Up/Down pulse counter for generating signals for acceleration, constant velocity and deceleration, 19 a digital-to-analog (D/A) converter for converting signal of digital value derived from the Up/Down pulse counter into analog value, 20 a flip-flop for moving the working table in the opposite (or negative) direction, 21 an "or" circuit for generating signal for clearing the flip-flops 11, 16 and 18 in response to the initial position and the reversely-turned position of the working table, 22 an in-phase amplifier for amplifying an analog signal derived from the D/A converter 19, into a level required in a motor driving circuit by changing polarity of the analog signal, to thereby move the working table in the positive direction, 23 an antiphase (or inverting) amplifier for amplifying the analog signal derived from the D/A converter 19, into the level necessary to the motor driving circuit by changing polarity of the analog signal, to thereby move the working table in the negative direction, 24 a switching circuit for selecting signal of the inverting amplifier 23 when moving the working table in the negative direction in response to the flip-flop 20, and 25 an output signal obtained from the present circuit construction, that is, a driving signal for controlling a DC motor.

When the working table is positioned at the first detecting point $S_1$ at which the first detector is arranged, the flip-flops 6, 11, 16 and 20, and the Up/Down pulse counter 18 are reset and are in a cleared state in accordance with the detecting signal 1 derived from the first detector. Thus, the output signal 25 becomes zero, and the DC motor for driving the working table is stopped.

When the start signal 5 of the working table is received, the flip-flop 6 is set and the clock generator 7 starts oscillation. The clock signal from clock generator 7 is applied to the Up input terminal of the Up/Down pulse counter 18 through the "and" circuit 12, causing the counter 18 to start its count up. The output signal of the counter 18 is converted into a DC voltage value which is proportional to the number of counted pulses by the D/A converter 19. The analog signal from the D/A converter 19 is amplified by the in-phase amplifier 25. Further, in accordance with the amplified signal from the in-phase amplifier 25, an output signal 25 with a positive voltage value is generated from the switching circuit 24. This output voltage is step-wisely increased in the positive direction in proportion to the number of pulses applied to the Up input of the counter 18. Thus, the movement of the working table is started and the table is accelerated.

When the working table comes to the second detecting point $S_2$ at which the second detector is arranged, the detecting signal 2 is generated from the second detector. In response to the detecting signal 2, the flip-flop 11 is set through the "and" circuit 8 and the "or" circuit 10. Thus, the "and" circuit 12 is inhibited, and the input signal of the pulse counter 18 is no longer applied to counter 18. As a result, the output signal 25 stops increasing and the voltage is thereafter maintained at a constant level. Thus, the working table is moved at a constant velocity.

The working table eventually reaches the third detecting point $S_3$ at which the third detector is arranged, and then the detecting signal 3 is generated from the third detector. In response to the detecting signal 3, the flip-flop 16 is set through the "and" circuit 13 and the "or" circuit 15. The clock signal derived from the clock generator 7 is therefore applied to the Down input terminal of the Up/Down pulse counter 18 through the "and" circuit 17. For this operation, the contents of the pulse counter 18 is in the subtracting direction, and the output voltage 25 is lowered in proportion to the input signal of the pulse counter 18. Thus, the moving velocity of the working table is decelerated.

Soon the working table reaches the fourth detecting point $S_4$ at which the fourth detector is arranged, and then the detecting signal 4 is generated from the fourth detector. The flip-flops 11, 16 and the Up/Down pulse counter 18 are reset and cleared. At the same time the flip-flop 20 is set, and the switching circuit 24 selects the inverting amplifier 23, so that the output voltage 25 exhibits a negative polarity. Also, since the flip-flop 11 has been reset, the "and" circuit 11 is enabled again, and the clock pulse signal from generator 7 is applied to the Up input terminal of the pulse counter 18. Thus, the output voltage of the D/A converter 19 begins to increase in proportion to the number of input pulses applied to counter 18. The voltage of the output signal 25 is step-wisely increased in the negative direction, and then, the working table begins to be moved in the negative direction.

When the working table reaches the third detecting point $S_3$, the detecting signal 3 derived from the third detector sets the flip-flop 11 through the "and" circuit 9 and the "or" circuit 10. The "and" circuit 12 is disabled and the input signal of the pulse counter 18 becomes zero, so that the output signal 25 is no longer increased in the negative direction, and the working table is moved thereafter at a constant velocity.

When the working table reaches the second detecting point $S_2$, in response to the detecting signal 2 derived from the second detector, the flip-flop 16 is set through the "and" circuit 14 and the "or" circuit 15. And then, the clock pulse signal derived from the clock generator 7 is applied to the Down input terminal of the pulse counter 18 through the "and" circuit 17. Thus, the pulse counter 18 begins to be decremented, and the output signal 25 of the switching circuit 24 begins to be decreased in amplitude, so that the working table continues to be moved but is gradually decelerated and approaches the initial position, that is, the first detecting point $S_1$.

When the working table comes back to the first detecting point $S_1$, the detecting signal 1 is provided from the first detector. In response to the detecting signal 1, the flip-flops 6, 11, 16, and 20, and the pulse counter 18 are cleared, and are thus returned to the initial state.

The reciprocating frequency of the working table is previously set in a preset register 26. The detecting signal 1 is applied to a counter 27. The output signal of the counter 27 and the contents of the register 26 are compared by a comparator 28. When the former and the latter become equal, the output signal of the comparator 28 is applied to an "and" circuit 29. Thus, when the working table has been repeatedly reciprocated a predetermined number of times, and the detecting signal 1 has been provided from the first detector, the flip-flop 6 and the counter 27 are cleared, and therefore, the predetermined movement of the working table is finished.

FIG. 3 is a time chart illustrating the signals in the respective parts of the control circuit shown in FIG. 1. In FIG. 3 the reference number 31 denotes a signal for instructing the start of the working table, 32 a clock signal derived from the clock generator 6, 33 a second detecting signal, 34 a signal representative of the interval for constant velocity, 35 a third detecting signal, 36 a signal representative of the interval for deceleration, 37 a fourth detecting signal, 38 a signal for detecting the initial position of the working table, that is, a first detecting signal, 39 a clock signal for acceleration, 310 a clock signal for deceleration, 311 an analog signal derived from the D/A converter 19, and 312 a driving signal obtained in accordance with the present invention, wherein the above-mentioned reference numbers are bracketed as shown in FIG. 1.

The output signal 25, that is, the driving signal, which has been obtained in the above-mentioned way, can be applied as an input signal of the driving circuit of a DC motor for driving the working table, as explained hereinafter, whereby the mechanical vibrations generated when the driving motor is started, stopped and reversed in direction, can be eliminated, and therefore, it is possible to uniformly work (or grind) a surface of workpiece with high precision. In the present invention, at the detecting points $S_1$ and $S_4$, the end portions of the working table in the respective moving direction are detected by the respective detectors. The intermediate detecting points $S_2$ and $S_3$ are separately arranged at a distance more than the length or width of the workpiece.

Figure 4:
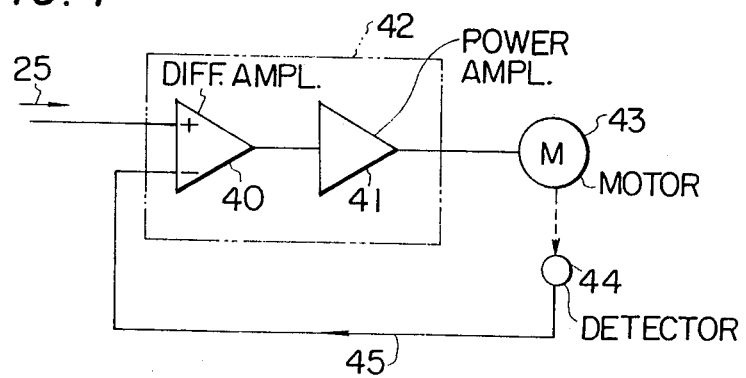
FIG. 4 is a circuit diagram illustrating an example of the driving circuit.

FIG. 4 is a circuit diagram illustrating an example of the driving circuit which may be used in accordance with the present invention. The output signal 25 obtained from the control circuit of FIG. 1, is applied to a DC motor 43 through an error amplifier 42, which comprises a differential amplifier 40 and a power amplifier 41, to thereby drive the working table (not shown in the drawing). In this case, the rotating velocity of the DC motor 43 is detected by a rotating velocity detector 44 (or tachometer), such as a tachogenerator or the like. And then, a velocity signal 45 sent from the detector 44 is applied to another input terminal of the differential amplifier 40. Thus, the rotating velocity of the DC motor 43 can follow the output signal 25 of the driving signal control circuit.

As mentioned above, the present invention has been described with reference to its application to a machine tool, such as a surface grinder, but it should be understood that the invention is not limited to such use and is further applicable to all means which are necessary to be smoothly started, stopped, and reversed in direction.

What is claimed is:

1. A driving signal control circuit for controlling a table of a machine tool in which the table is mounted so as to be reciprocated by drive means, and in which a workpiece mounted on the table can be worked, comprising clock generator means for generating a clock pulse signal;

detector means including at least four detectors positioned with respect to said table so as to detect the presence of said table at four respective positions as it is reciprocated;

gate circuit means responsive to a first detecting signal derived from a first one of said detectors for selectively passing said clock signal pulses as up signal pulses and responsive to a fourth detecting signal derived from a fourth one of said detectors for selectively passing said clock signal pulses as down signal pulses and for generating a switching signal, second and third detecting signals from second and third ones of said detectors serving to inhibit said gate circuit means;

counter means for adding said up signal pulses and for subtracting said down signal pulses derived from said gate circuit means;

converter means for converting a digital output signal derived from said counter circuit means into an analog signal;

switching circuit means responsive to the output of said converter means for generating a driving signal with negative polarity or positive polarity corresponding to the switching signal derived from said gate circuit means;

whereby the table can be smoothly reciprocated by said driving means responsive to said driving signal without generating a mechanical vibration in the table when it is started, stopped and reversed in direction of movement.

2. A driving signal control circuit as claimed in claim 1, wherein said detector means comprises four detectors provided along the path of movement of the table, said first and fourth detectors defining the end points of said path of movement.

3. A driving signal control circuit as claimed in claim 2, wherein the table is moved in the direction from said first detector to said fourth detector in response to said driving signal with positive polarity, while in response to said driving signal with negative polarity, the table is returned in the direction from said fourth detector to said first detector, said first to fourth detectors respectively generating first to fourth detecting signals every time the table reaches the respective positions of said detectors.

4. A driving signal control circuit as claimed in claim 1, wherein said switching circuit means comprises an in-phase amplifier and an inverting amplifier to each of which said analog signal is applied, and a switching circuit for selecting the output of one of said amplifiers in accordance with said switching signal to thereby generate said driving signal with positive or negative polarity.

5. A driving signal control circuit as claimed in claim 3, wherein said gate circuit means comprises a first flip-flop of which the reset input terminal is connected to said first detector, the set input terminal of said first flip-flop being connected to said fourth detector, a first AND circuit of which one input terminal is connected to a Q output terminal of said flip-flop, another input terminal of said first AND circuit being connected to said second detector, a second AND circuit of which one input terminal is connected to the Q output terminal of said first flip-flop, another input terminal of said second AND circuit being connected to said third detector, a third AND circuit of which one input terminal is connected to the $\overline{Q}$ output terminal of said first flip-flop, another input terminal of said third AND circuit being connected to said second detector, a fourth AND circuit of which one input terminal is connected to the $\overline{Q}$ output terminal of said first flip-flop, another input terminal of said fourth AND circuit being connected to said third detector, a first OR circuit to which output signals of said first and fourth AND circuits are applied, a second OR circuit to which output signals of said second and third AND circuits are applied, a third OR circuit to which said first and fourth detecting signals are applied, a second flip-flop of which the reset input terminal is connected to the output terminal of said third OR circuit, the set input terminal of said second flip-flop being connected to an output terminal of said first OR circuit, a third flip-flop of which the reset input terminal is connected to the output terminal of said third OR circuit, the set input terminal of said third flip-flop being connected to the output terminal of said second OR circuit, a fifth AND circuit to which the Q output signal of said second flip-flop and said clock signal derived from said clock generator means are applied, and a sixth AND circuit to which the $\overline{Q}$ output signal of said third flip-flop and said clock signal are applied.

6. A driving signal control circuit as claimed in claim 1, wherein said detector means comprises photoelectric elements.

7. A driving signal control circuit as claimed in claim 1, further including register means capable of being preset to the desired reciprocating frequency of the table.

8. A driving signal control circuit as claimed in claim 7, further including detector means for detecting the reciprocating frequency of the table in accordance with said detecting signals, and means for comparing the detected reciprocating frequency with the frequency previously set in said register means and for generating a signal for stopping said clock generator means when the former frequency becomes equal to the latter frequency.

9. A driving signal control circuit as claimed in claim 8, further including a fourth flip-flop to which a start signal is applied as a set input, and from which a signal for operating said clock generator means is provided as a Q output.

10. A driving signal control circuit as claimed in claim 9, wherein said detector means comprises a counter to which said first detecting signal is applied and said comparing means comprises a comparator for comparing the output of said counter with the output of said register means and for generating signal when the former output value is equal to the latter output value, and a seventh AND circuit to which the output signal of said comparator and said first detecting signal are applied and of which the output signal is input to the reset input terminal of said fourth flip-flop.

11. A driving signal control circuit as claimed in claim 1, wherein said counter means comprises an Up-/Down pulse counter.

* * * * *